United States Patent
Fletcher et al.

(10) Patent No.: US 9,732,871 B2
(45) Date of Patent: Aug. 15, 2017

(54) ASPIRATED RELIEF VALVE FOR A TURBOCHARGING SYSTEM

(71) Applicants: David E. Fletcher, Flint, MI (US); Brian M. Graichen, Leonard, MI (US); James H. Miller, Ortonville, MI (US); Keith Hampton, Ann Arbor, MI (US); Matthew C. Gilmer, Whitmore Lake, MI (US)

(72) Inventors: David E. Fletcher, Flint, MI (US); Brian M. Graichen, Leonard, MI (US); James H. Miller, Ortonville, MI (US); Keith Hampton, Ann Arbor, MI (US); Matthew C. Gilmer, Whitmore Lake, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 103 days.

(21) Appl. No.: 14/800,027

(22) Filed: Jul. 15, 2015

(65) Prior Publication Data
US 2016/0017792 A1  Jan. 21, 2016

Related U.S. Application Data

(60) Provisional application No. 62/025,548, filed on Jul. 17, 2014.

(51) Int. Cl.
| F02B 37/18 | (2006.01) |
| F16K 17/02 | (2006.01) |
| F16K 24/04 | (2006.01) |
| F02B 37/16 | (2006.01) |
| F16K 37/00 | (2006.01) |

(52) U.S. Cl.
CPC .............. *F16K 24/04* (2013.01); *F02B 37/16* (2013.01); *F16K 37/0033* (2013.01); *Y02T 10/144* (2013.01)

(58) Field of Classification Search
CPC ....... F16K 24/04; F16K 37/0033; F02B 37/16
See application file for complete search history.

(56) References Cited

U.S. PATENT DOCUMENTS

| 2,559,859 A | * | 7/1951 | Elliott | ........................ | F02D 9/00 |
| | | | | | 123/406.69 |
| 4,222,240 A | | 9/1980 | Castellano | | |

(Continued)

OTHER PUBLICATIONS

PCT, International Search Report and Written Opinion; PCT/US2015/040504 (Oct. 8, 2015).

*Primary Examiner* — Craig Schneider
*Assistant Examiner* — Kevin Barss
(74) *Attorney, Agent, or Firm* — Fisher Broyles, LLP; Susan M. Oiler

(57) ABSTRACT

A valve assembly is disclosed, and includes an evacuator and a relief valve. The evacuator includes a suction port that selectively applies a vacuum. The relief valve has an open position and a closed position, and includes an inlet, an outlet, a piston that translates within a chamber, and a pressurized chamber. The piston includes a first end and a second end. The pressurized chamber is fluidly connected to the suction port of the evacuator, and is defined in part by the first end of the piston. The piston translates within the pressurized chamber towards the open position if vacuum is applied to the pressurized chamber.

17 Claims, 9 Drawing Sheets

(56) References Cited

U.S. PATENT DOCUMENTS

| | | | |
|---|---|---|---|
| 4,528,815 A * | 7/1985 | Arnaud | F02B 37/16 60/600 |
| 5,064,423 A | 11/1991 | Lorenz et al. | |
| 5,203,309 A | 4/1993 | Goto et al. | |
| 8,534,065 B2 | 9/2013 | Pursifull et al. | |
| 2011/0083646 A1 | 4/2011 | Siuchta et al. | |
| 2011/0132311 A1 | 6/2011 | Pursifull et al. | |
| 2013/0340428 A1 | 12/2013 | Graichen et al. | |
| 2014/0069534 A1 | 3/2014 | Cunningham et al. | |
| 2014/0165931 A1 | 6/2014 | Pursifull | |

* cited by examiner

ASPIRATED RELIEF VALVE FOR A TURBOCHARGING SYSTEM

RELATED APPLICATIONS

This application claims the benefit of U.S. Provisional Application No. 62/025,548, filed on Jul. 17, 2014.

TECHNICAL FIELD

The present invention relates generally to a relief valve, where an evacuator is used to provide a vacuum to actuate the relief valve into an open position.

BACKGROUND

Internal combustion engines may be used in a variety of applications such as, for example, passenger and industrial vehicles, marine, stationary and aerospace applications. There are generally two dominant ignition cycles, which are commonly referred to as gas and diesel cycles, or more formally as spark ignited (SI) and compression ignition (CI) cycles, respectively.

Exhaust-driven turbochargers may be used to improve the power output and overall efficiency of an internal combustion engine. Specifically, exhaust gas energy may be used to drive a turbine. The turbocharger includes a compressor and a turbine, where the compressor is mounted on a shaft of the turbocharger, opposite the turbine. The turbine converts engine exhaust gas into mechanical energy, which is used to drive the compressor. The compressor draws in and compresses air. The compressed air is then directed to an intake manifold of the internal combustion engine.

A relief valve, such as a compressor discharge valve or a blow-off valve, may be mounted on an intake pipe located downstream of the turbocharger before a throttle. Specifically, a compressor discharge valve may be used to vent compressed air back into an inlet of the compressor. A blow-off valve is similar to a compressor recirculation valve, but vents to the atmosphere rather than back to the inlet of the compressor. The relief valve may be used to alleviate a sudden surge or spike in pressure that may occur when the throttle closes (i.e., when an operator suddenly lifts his or her foot off of the gas pedal and the throttle closes).

Air compression systems have been used on semi-trucks and other types of commercial vehicles in order to power air brakes. The air compression system may include an air compressor that is used to supply compressed air to a storage tank. The air compressor may be powered by a crankshaft pulley, or by timing gears of the internal combustion engine. The compressed air in the storage tank may be used for the air brakes. In addition to the air brakes, the compressed air may also be used to actuate the relief valve (i.e., the compressor discharge or blow-off valve). Specifically, a vacuum pump may allow the compressed air in the storage tank to selectively flow to the relief valve. The vacuum pump may be driven by an electric motor, or by the crankshaft or other rotatable shaft of the internal combustion engine. However, the vacuum pump may add significant cost and complexity to the system. Accordingly, there exists a need in the art for a simpler, cost-effective approach to actuate a relief valve in a turbocharger system, especially in semi-trucks and other types of commercial vehicles.

SUMMARY

The disclosed valve assembly includes a relief valve and an evacuator. The evacuator may be used to create a vacuum within a pressurized chamber of the relief valve. The vacuum created by the evacuator is a relatively simple and low-cost approach to actuate the relief valve from a closed position and into an open position.

In one aspect, the disclosed valve assembly includes an evacuator and a relief valve. The evacuator includes a suction port that selectively applies a vacuum. The relief valve has at least an open position and a closed position, and includes an inlet, an outlet, a piston that translates within a chamber, and a pressurized chamber. The piston includes a first end and a second end. The pressurized chamber is fluidly connected to the suction port of the evacuator, and is defined in part by the first end of the piston. The piston translates within the chamber towards the open position if vacuum is applied to the pressurized chamber.

In another aspect, a system including an exhaust-driven turbo charger is disclosed and includes a storage tank containing compressed air, a control valve that is selectively opened to allow for the compressed air within the storage tank to flow therethrough, an evacuator and relief valve. The evacuator is fluidly connected to the control valve and a compressor inlet of the exhaust-driven turbo charger. The evacuator includes a suction port that applies a vacuum if the control valve is opened. The relief valve has at least an open position and a closed position. The relief valve is fluidly connected to the evacuator. The relief valve is actuated into the open position if the vacuum is applied by the evacuator.

DETAILED DESCRIPTION

Figure 1:
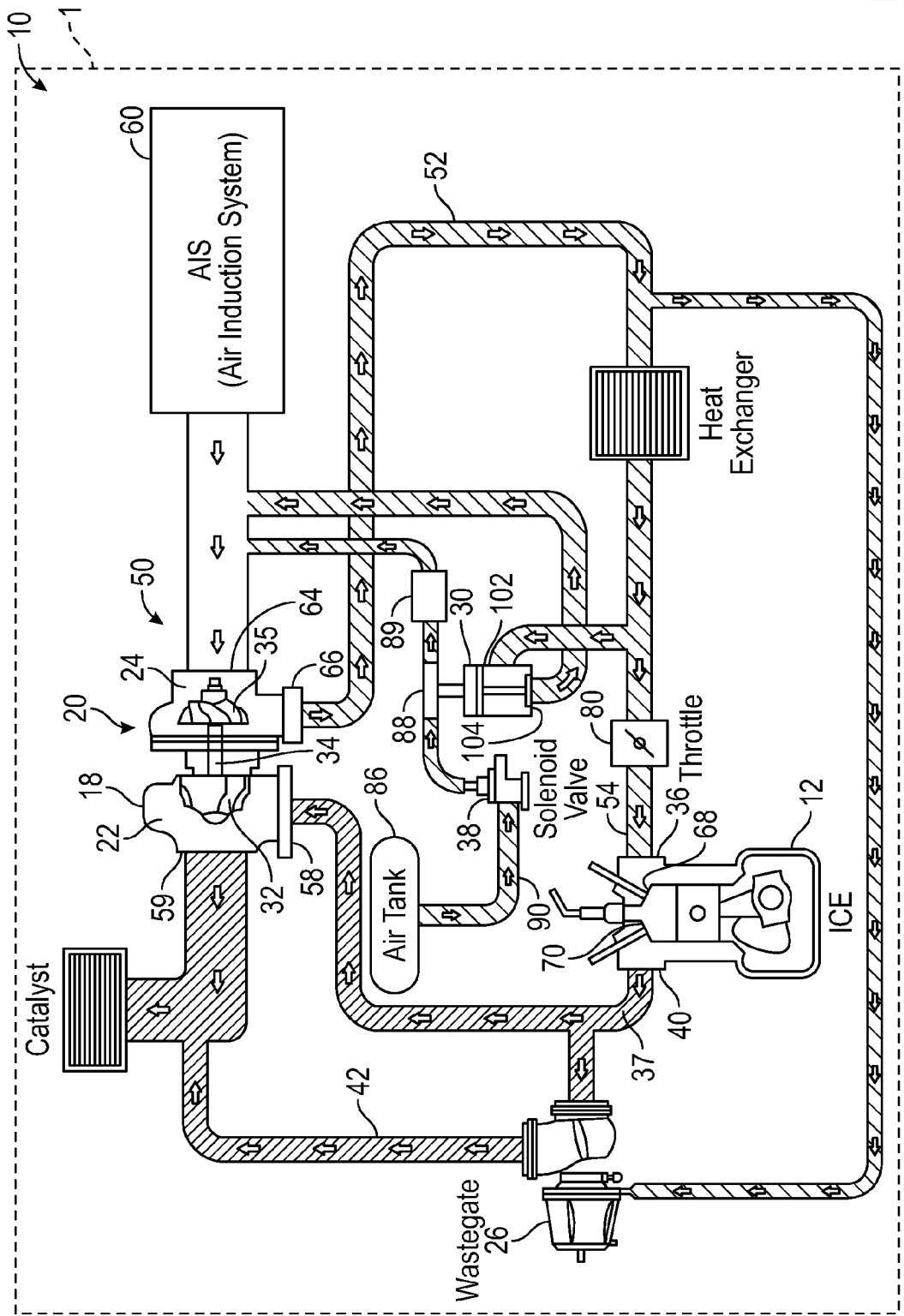
FIG. 1 is a diagram including flow paths and flow directions of one embodiment of an internal combustion engine turbo system that includes a relief valve and an evacuator.

The following detailed description will illustrate the general principles of the invention, examples of which are additionally illustrated in the accompanying drawings. In the drawings, like reference numbers indicate identical or functionally similar elements.

Referring now to FIG. 1, an exemplary schematic diagram of a turbo system 10 for an internal combustion engine 12 is illustrated. In one embodiment, the internal combustion engine 12 is a compression ignition ("CI") or diesel engine of a vehicle 1, however it is to be understood that other types of engines such as spark ignited (SI) or gas engines may be used as well. The turbo system 10 may include an exhaust-driven turbo charger ("EDT") 20 having a turbine section 22 and compressor section 24, a turbine bypass valve or wastegate 26, and a relief valve 30. An exhaust housing 18 of the EDT 20 contains a turbine wheel 32. A turbine wheel 32 harnesses and converts exhaust energy into mechanical work through a common shaft 34 to turn a compressor wheel 35. The compressor wheel 35 ingests, compresses and feeds air at elevated operating pressures into an intake manifold 36 of the internal combustion engine 12.

The wastegate 26 is a control valve used to meter an exhaust volume 37 exiting an exhaust manifold 40 of the internal combustion engine 12, and controls the amount of energy available to power the turbine wheel 32. The wastegate 26 works by opening a valve (not shown) connected to a bypass pipe 42. Opening the valve of the wastegate 26 allows for exhaust to flow away from the turbine wheel 32. Thus, the wastegate 26 may have direct control over the speed of the EDT 20 and the resultant operating pressure of the intake manifold 36 of the internal combustion engine 12. The wastegate 26 may have any number of embodiments, including the embodiments disclosed in Applicant's U.S. Pat. No. 8,469,333, which is incorporated by reference herein in its entirety.

Operation of the EDT 20 may now be explained. It is to be appreciated that operating pressures exist in an EDT compressor inlet 50, the intake manifold 36 of the internal combustion engine 12 and an intake manifold pipe 52, the exhaust manifold 40 of the internal combustion engine 12 and an intake manifold pipe 54, an exhaust inlet 58 of the EDT 20, and an exhaust outlet 59 of the EDT 20. Specifically, the EDT compressor inlet 50 may be defined as the passageway from an air intake system 60 to an inlet 64 of the compressor section 24. The intake manifold 36 of the internal combustion engine 12 may be defined as the passage between an EDT compressor discharge 66 and one or more intake valves 68 of the internal combustion engine 12. The exhaust manifold 40 of the internal combustion engine 12 may be defined as the passage between one or more exhaust valves 70 and the exhaust inlet 58 of the EDT. The exhaust may be any passageway located after the exhaust outlet 59 of the EDT 20.

A storage tank 86 may be used to store high pressure or compressed air. A secondary air compressor (not illustrated) may be used to supply the compressed air located in the storage tank 86. In one embodiment, the compressed air may be used for power air brakes (not illustrated) on the vehicle 1. In addition to the air brakes, the compressed air stored in the air tank 86 may also be used for supplying compressed air to an evacuator 88, which is described in greater detail below.

The relief valve 30 may be a regulating valve located in the intake manifold pipe 52 between the compressor discharge 66 of the compressor section 24 of the EDT 20 and the intake manifold 36 of the internal combustion engine 12. In the embodiment as shown in FIG. 1, the relief valve 30 is a compressor recirculation valve that is fluidly connected to and vents compressed air back into the EDT compressor inlet 50. However, it should be noted that in another embodiment, the turbo system 10 may utilize a blow-off valve as well. A blow-off valve is similar to a compressor recirculation valve, but vents to the atmosphere rather than back to the compressor inlet of an EDT. An on/off or control valve 38 may be fluidly connected upstream of the evacuator 88, and is used to selectively allow the compressed air within the storage tank 86 to flow through the evacuator 88. In one embodiment, the control valve 38 may be a solenoid valve. A muffler or noise attenuator 89 may be located downstream of the evacuator 88, between the control valve 38 and the EDT compressor inlet 50.

A high-pressure pipe 90 may be used to fluidly connect the storage tank 86 to the evacuator 88. The evacuator 88 may be located between the storage tank 86 and the EDT compressor inlet 50. The evacuator 88 may be in fluid communication with the control valve 38, the relief valve 30, and the EDT compressor inlet 50. The evacuator 88 may be a relatively simple, cost-effective approach for creating a vacuum in the relief valve 30. The vacuum created by the evacuator 88 may be used to actuate the relief valve 30 into an open position, which is described in greater detail below. In an alternative embodiment, the evacuator 88 may be located between the storage tank and atmosphere.

In the exemplary embodiment as shown in FIG. 1, the relief valve 30 may be used with a throttle plate 80. At any given operating range of the internal combustion engine 12, the shaft 34 of the EDT 20 may be spinning up to 200,000 revolutions per minute (RPM). A sudden closing of the throttle 80 does not immediately decelerate the RPM of the EDT 20. Therefore, this closing creates a sudden increase in pressure in the passages between the closed throttle 80 and EDT compressor section 24 (i.e., the intake manifold pipe 52). The relief valve 30 may be used to relieve or bypass the compressor output pressure that is greater than what is required due to the sudden closing of the throttle 80.

When the relief valve 30 is opened the EDT 20 may spin freely, thereby conserving the inertia of the EDT 20. If the relief valve 30 was omitted, the EDT 20 would stall or stop once the throttle 80 is closed. This stalling or stopping may adversely affect EDT life and throttle response. Those skilled in the art will appreciate that the EDT 20 should be spinning and ready to produce boost as soon as the throttle plate 80 is opened. The relief valve 30 may decrease turbo lag by allowing the EDT 20 to spin up to speed (i.e., spool up) without compressor load, as there is no back pressure present once the relief valve 30 is opened.

Figure 5:
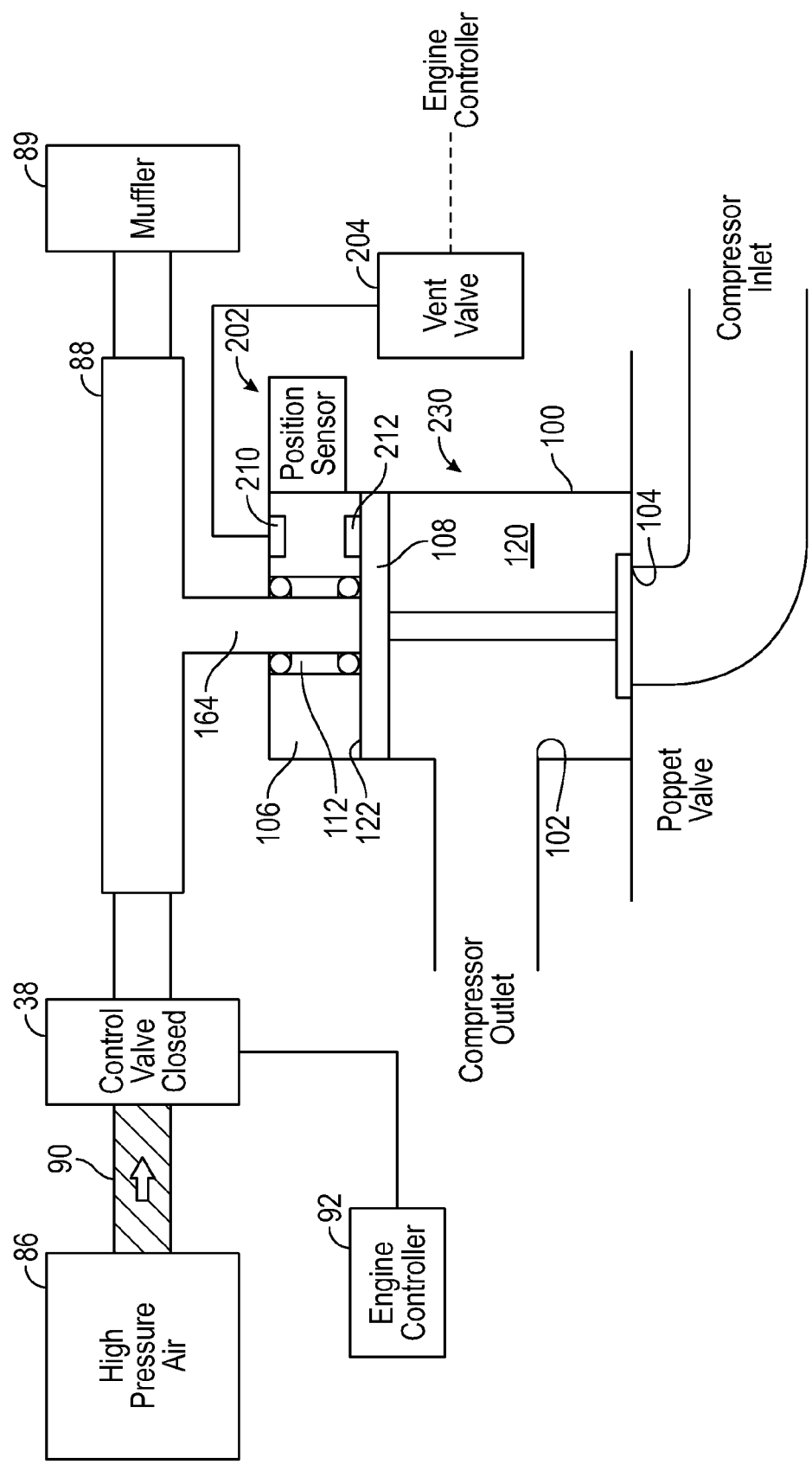
FIG. 5 is a diagram of an alternative embodiment of a variable relief valve and evacuator shown in FIG. 1.

In one embodiment, the relief valve 30 is a variable relief valve. The variable relief valve is illustrated in FIG. 5, and is also described in greater detail below. A variable relief valve may allow for just the amount of bypass required to substantially prevent compressor surge. Compressor surge may be defined as when the air pressure after the compressor wheel 35 is actually higher than what the compressor wheel 35 is capable of maintaining. This condition causes the airflow in the compressor wheel 35 to back up, build pressure, or stall. Thus, compressor surge is noisy, affects EDT life, and may reduce the performance of the turbo system 10.

Figure 2:
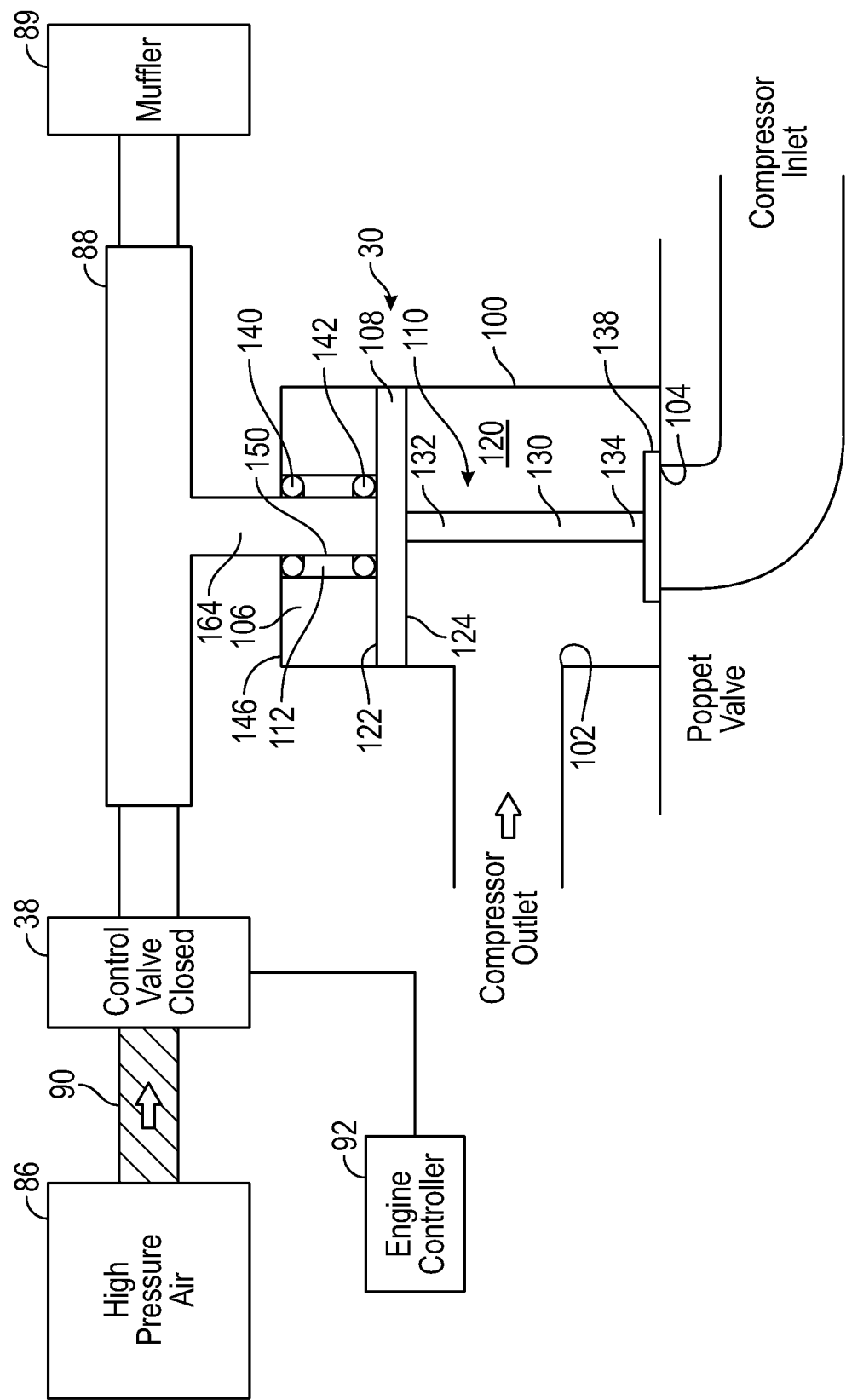
FIG. 2 is a diagram of the relief valve and evacuator shown in FIG. 1, where the relief valve is in a closed position.
Figure 3:
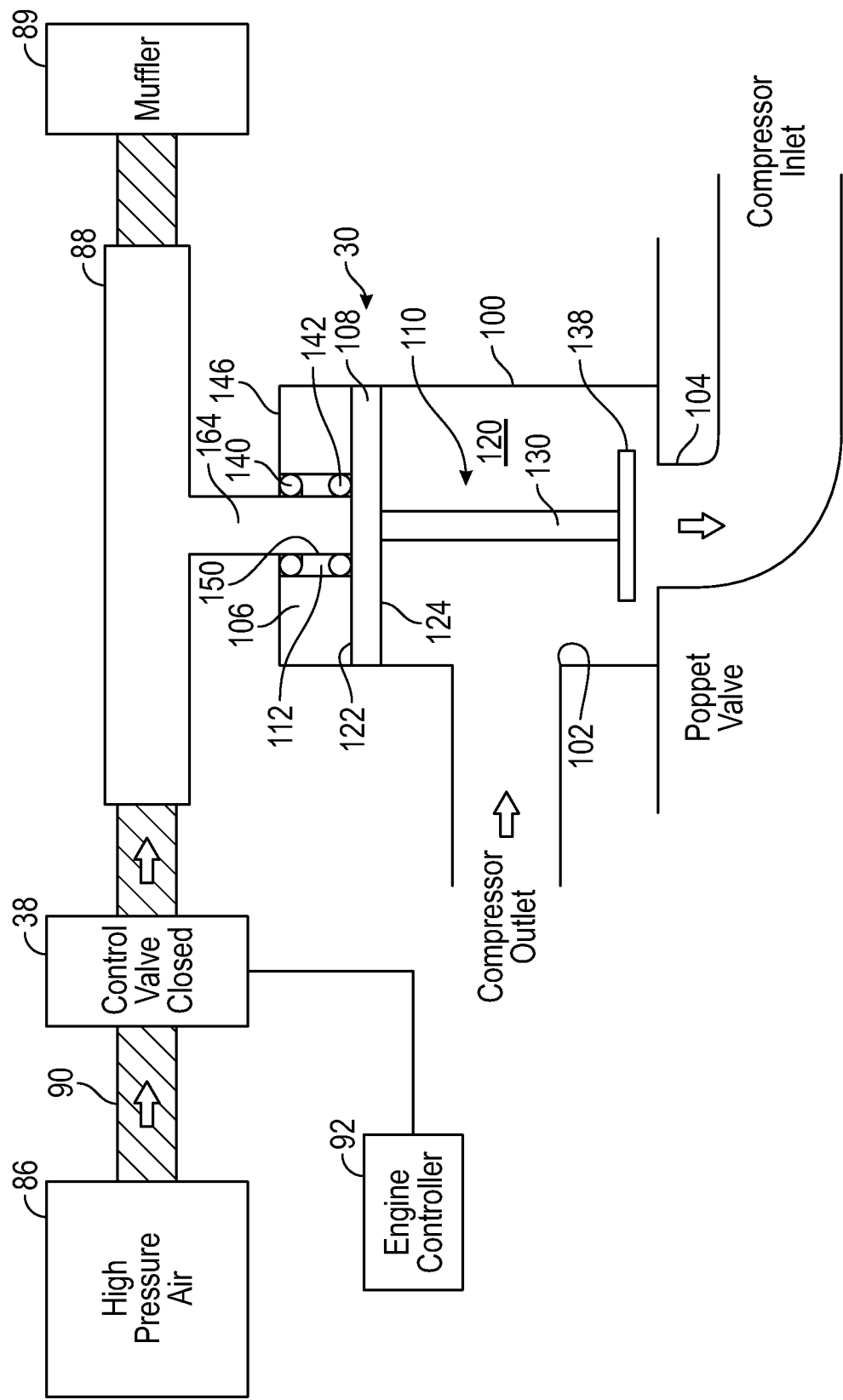
FIG. 3 is a diagram of the relief valve and evacuator shown in FIG. 1, where the relief valve is in an open position.

FIGS. 2-3 are a schematic diagram of the relief valve 30, the control valve 38, the evacuator 88, the storage tank 86, the noise attenuator 89, and a controller 92. In one embodiment, the controller 92 may be an engine or a powertrain control module. The engine controller may be used to provide control of one or more functions of the internal combustion engine 12 (FIG. 1). The controller 92 may be in signal communication with the control valve 38. The controller 92 may refer to an application specific integrated circuit (ASIC), an electronic circuit, a processor (shared, dedicated, or group) and memory that executes one or more software or firmware programs, a combinational logic circuit, or other suitable components that provide the described functionality.

The relief valve 30 may include a valve body 100 that defines an inlet port 102, an outlet port 104, and a pressurized chamber 106. In the non-limiting embodiment as shown in FIGS. 2-3, the inlet port 102 of the relief valve 30 is fluidly connected with the EDT compressor discharge 66 (FIG. 1) and the outlet port 104 is fluidly connected with EDT compressor inlet 50 (FIG. 1). The relief valve 30 may also include a piston 108, a valve element 110, and a biasing element 112. The valve body 100 may also define a chamber 120. In one embodiment, the chamber 120 may be generally cylindrical in shape. The piston 106 may include a first end 122 and a second end 124, and may be sized to translate in a linear direction within the chamber 120 of the valve body 100. FIG. 2 illustrates the valve 30 in a closed position, and FIG. 3 illustrates the valve 30 in an open position. Specifically, the piston 120 may translate or move up and down within the chamber 120 of the valve body 100 between the closed position and the open position. Although FIG. 2-3 describe the chamber 120 as an integral part of the valve body 100 (i.e., the chamber 120 and the valve body 100 are a single, unitary part), it is to be understood that the chamber 120 may also be a separate piece mounted to the relief valve 30 as well.

In the non-limiting embodiment as shown, the valve element 110 is a poppet-style valve including a valve stem 130. The valve stem 130 includes a first end 132 and a second end 134. The first end 132 of the valve stem 130 may be connected to the second end 124 of the piston 108, and a head 138 of the valve element 110 may be positioned at the second end 134 of the valve stem 130. Referring to FIG. 2, when the relief valve 30 is in the closed position, the head 138 of the valve element 110 may be used to generally seal or block off the outlet port 104. Therefore, the head 138 of the valve element 110 may generally block or prevent a fluid from flowing from the inlet port 102 to the outlet port 104. As used herein, a fluid may include any liquid, colloid, gas, plasma, or combination thereof.

When a vacuum is applied to the pressurized chamber 106 of the relief valve 30, the piston 108 may move in an upwards direction and into the open position as shown in FIG. 3. When the relief valve 30 is in the open position, the head 138 of the valve element 110 may be moved away and no longer blocks or seals off the outlet port 104. Thus, a fluid may flow through from the inlet port 102 to the outlet port 104 of the relief valve 30 without any substantial obstruction or blockage by the head 138 of the valve element 110 when the relief valve 30 is in the open position.

Turning back to FIG. 2, the biasing element 112 may include a first end 140 and a second end 142. The first end 140 of the biasing element 112 may abut against the first end 122 of the piston 108. The second end 142 of the biasing element 112 may abut against a cap 146 of the relief valve 30. The biasing element 112 may exert a biasing force against the first end 122 of the piston 106. Specifically, the biasing force may be exerted in a downwards direction, and towards the outlet port 104 of the relief valve 30. The biasing force may be used to prevent the piston 108 from translating within the chamber 120 of the relief valve 30 and into the open position due to high boost pressure in the turbo system 10 (FIG. 1). In one exemplary embodiment, the biasing element may be a compression spring.

Continuing to refer to FIG. 2, the cap 146 may be affixed or otherwise attached to the valve body 100 of the relief valve 30. The cap 146 may define an opening 150. The opening 150 of the cap 146 may be used to fluidly connect the evacuator 88 with the pressurized chamber 106 of the relief valve 30. The pressurized chamber 106 may be defined by the cap 146, a portion of the chamber 120, and the first end 122 of the piston 108. The piston 108 translates within the chamber 120 upwards and towards the cap 146 when a summation of forces acting on the piston 108 by the biasing element 112 and a difference in pressure acting on the first end 122 and the second end 124 of the piston 108 is greater that a force applied to the head 138 of the valve element 110 due a pressure differential between the inlet port 102 to the outlet port 104 of the relief valve 30. The control valve 38 may normally be in a closed position, thereby preventing the compressed air from the storage tank 86 (FIG. 1) from flowing through the evacuator 88. However, when the control valve 38 is opened, compressed air located within the storage tank 86 may flow through the evacuator 88. The flow of compressed or high pressure air through the evacuator 88 may create a vacuum. The vacuum generated by the evacuator 88 may be communicated to the pressurized chamber 106 of the relief valve 30. When vacuum is applied to the pressurized chamber 106 of the relief valve 30, this reduces the pressure located within the pressurized chamber 106. The reduction in pressure within the pressurized chamber 106 creates a force that is sufficient to overcome the downwards biasing force exerted by the biasing element 112. This in turn urges the piston 108 upwardly within the chamber 120 of the valve body 100, and the relief valve 30 is now in the open position as seen in FIG. 3.

Referring generally to FIGS. 1-3, if the internal combustion engine 12 is either not operating or has initially started, the controller 92 may send a control signal to the control valve 38 to remain in the closed position, thereby blocking the compressed air from the storage tank 86 (FIG. 1) to the evacuator 88. The controller 92 monitors various operating parameters of the internal combustion engine 12 and the turbo system 10 to determine if the relief valve 30 needs to be opened. The controller 92 may send a control signal to actuate the control valve 32 into the open position, thereby allowing the compressed air located within the storage tank 86 to flow through the evacuator 88 and create a vacuum. As explained above, the vacuum may be used to actuate the relief valve 30 into the open position as seen in FIG. 3.

Figure 4:
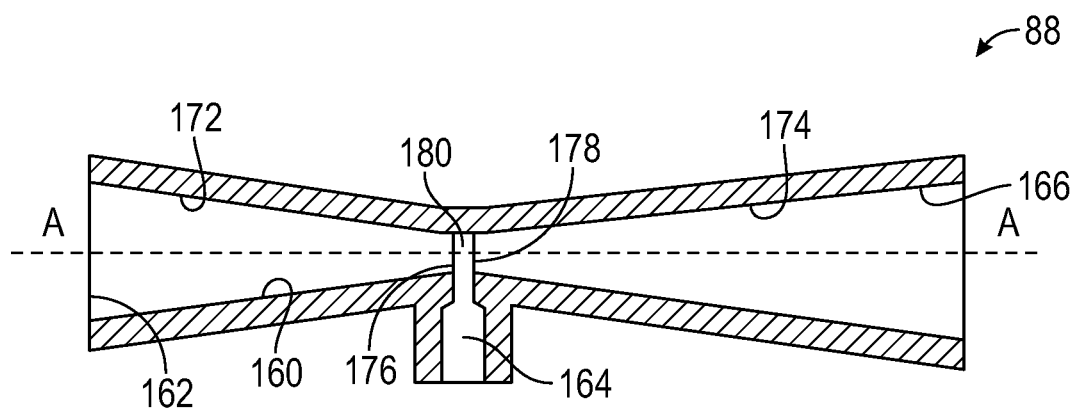
FIG. 4 is a diagram of the evacuator shown in FIG. 1.

Referring to FIGS. 2-4, the evacuator 88 creates a vacuum provided to the pressurized chamber 106 of the relief valve 30 by the flow of high pressure air from the storage tank 86 through a passageway 160. The passageway 160 of the evacuator 88 may generally extend the length of the evacuator 88, and is configured to create the Venturi effect. The evacuator 88 may also include a motive or high pressure port 162 that is in fluid communication with the high pressure air from the storage tank 86 (FIG. 1), a suction port 164 which is connected to the pressurized chamber 106 of the relief valve 30, and an evacuator outlet or low pressure port 166, which is connected to the noise attenuator 89.

Referring to FIG. 4, the evacuator 88 may be generally "T-shaped" and defines the passageway 160 along a central axis A-A. The passageway 160 may include a first tapering portion or motive cone 172 coupled to a second tapering portion or discharge cone 174. In the embodiment as shown, the first tapering portion 172 includes a tapered converging profile, and the second tapered portion 174 includes a diverging profile. The first tapering portion 172 and the second tapering portion 174 may be aligned end to end, where a motive outlet end 176 of the motive cone 172 faces a discharge inlet 178 of the discharge cone 174 to define a Venturi gap 180 therebetween. The Venturi gap 180 as used herein means the lineal distance between the motive outlet end 176 and the discharge inlet 178. Some exemplary configurations for the evacuator 88 are presented in FIGS. 4-6 of co-pending U.S. patent application Ser. No. 14/294,727, filed on Jun. 3, 2014, which is incorporated by reference herein in its entirety.

Referring to FIG. 1-4, during operation when the control valve 38 is opened, compressed air located within the storage tank 86 may enter the high pressure port 162 of the evacuator 88. As the compressed air flows through the high pressure port 162, which includes a converging profile that decreases in area, the velocity of the compressed air may increase. This is because the laws of fluid mechanics state that the static pressure decreases as fluid velocity increases. The motive outlet end 176 of the motive cone 172 may abut the Venturi gap 180. The Venturi gap 180 may be fluidly connected to the suction port 164, which exposes the compressed air in the suction port 164 to the same low static pressure that exists in the air that passes between the high pressure port 162 and the low pressure port 166 and creates the vacuum that is provided to the pressurized chamber 106 of the relief valve 30.

In the embodiments as described above and shown in FIGS. 2-3, the relief valve 30 operates as an open/close valve that is either fully open or fully closed. However, in the alternative embodiment as shown in FIG. 5, a variable relief valve 230 may be provided. FIG. 5 is a schematic diagram of the relief valve 30, the control valve 38, the evacuator 88, the storage tank 86, the controller 92, a position sensor 202, and a vent valve 204. The position sensor 202 and the vent valve 204 are in signal communication with the controller 92. The position sensor 202 may be provided to detect the position of the piston 108 within the chamber 120 of the valve body 100 as the piston 108 is actuated between the closed position and the open position. In another embodiment, the vent valve 204 may not be connected to the controller 92, and instead is a simple restriction connected to atmosphere.

The position sensor 202 may be any device that permits position measurement. In one embodiment, the position sensor 202 is a relative position sensor (a displacement sensor) based on movement of the piston 108 within the chamber 120 of the valve body 100. The position sensor 202 may be a capacitive transducer, an eddy-current sensor, a grating sensor, a Hall-effect sensor, an inductive non-contact position sensor, a laser Doppler Vibrometer (optical), a linear variable differential transformer (LVDT), a multi-axis displacement transducer, a photodiode array, a piezo-electric transducer (piezo-electric), a potentiometer, a proximity sensor (optical), a seismic displacement pick-up, a string potentiometer (also known as string pot., string encoder, cable position transducer), or a combination thereof.

In one embodiment, the position sensor 202 is a Hall effect sensor comprising a chip/Hall effect position sensor 210 that sensors the displacement of a magnet 212. The magnet 212 may be connected to the piston 120 for translation therewith. Specifically, the magnet 212 may be mounted to or placed within the piston 108. The chip/Hall effect position sensor 210 may be positioned within the valve body 100 in sufficient proximity to sense the movement of the magnet 212 located within the piston 108, and determine the specific position of the piston 108 within the chamber 120 of the valve body 100. In the embodiment as shown in FIG. 5, the chip/Hall effect position sensor 210 is oriented horizontally in a position above the magnet 212 (i.e., axial relative to the magnet 212). In another embodiment, the chip/Hall effect position sensor 210 may be oriented vertically in a position radially outward away from the magnet 212.

The vent valve 204 may be in fluid communication with the pressurized chamber 106 of the valve body 100, and connects the pressurized chamber 106 to the atmosphere. The vent valve 204 may be used to vent off or decrease the amount of vacuum in the pressurized chamber 106. Specifically, when the control valve 38 is opened, compressed air located within the storage tank 86 may flow through the evacuator 88 to create the vacuum. The vent valve 204 may be used to vary the amount of vacuum located in the pressurized chamber 106. Varying the amount of vacuum in the pressurized chamber 106 may control the position of the piston 108 within the chamber 120 of the valve body 100. In other words, the piston 108 may be positioned in any one of a plurality of partially opened positions based on a predetermined amount of vacuum applied to the pressurized chamber 106.

In one embodiment, the amount of vacuum applied to the pressurized chamber 106 may be varied using pulse width modulation (PWM) control. Specifically, the controller 92 may send a current signal to the vent valve 204. The current signal may be used to modulate the vent valve 204 off and on. A duty cycle of the current signal is varied in order to position the piston 108 in one of the partially opened positions within the chamber 120 of the valve body 100.

Figure 6:
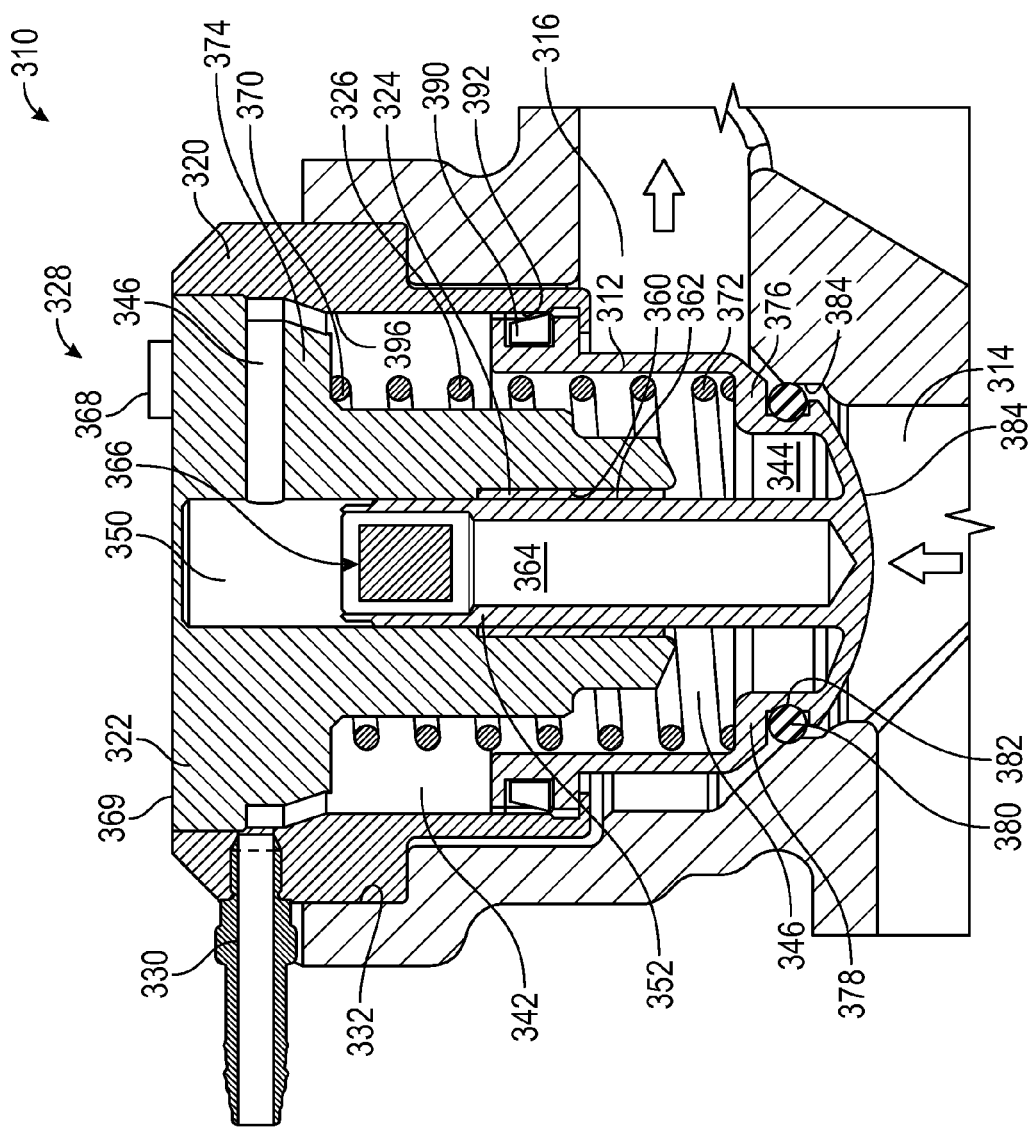
FIGS. 6 and 7 are an illustration of one embodiment of a variable relief valve in a closed position.
Figure 7:
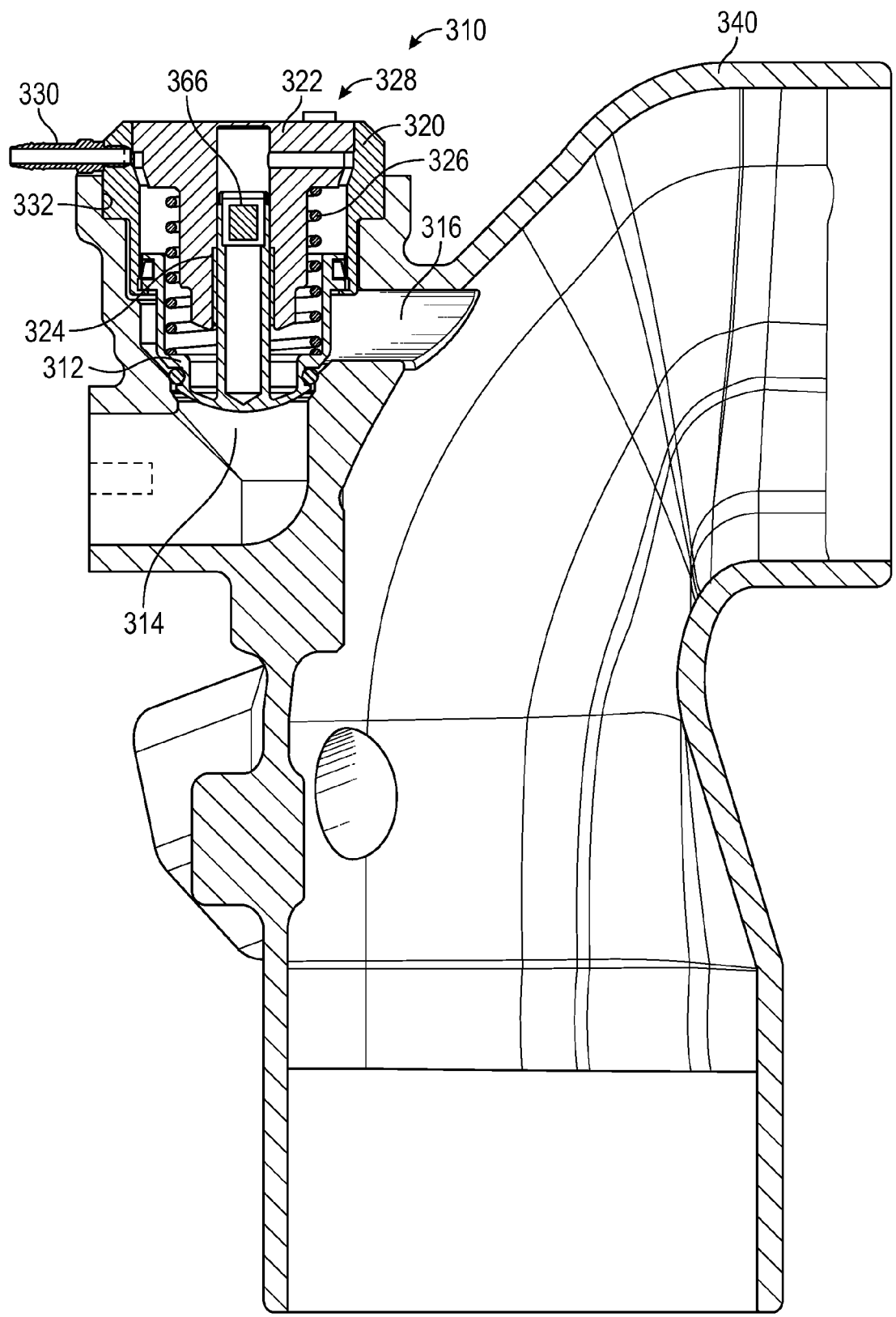
Figure 8:
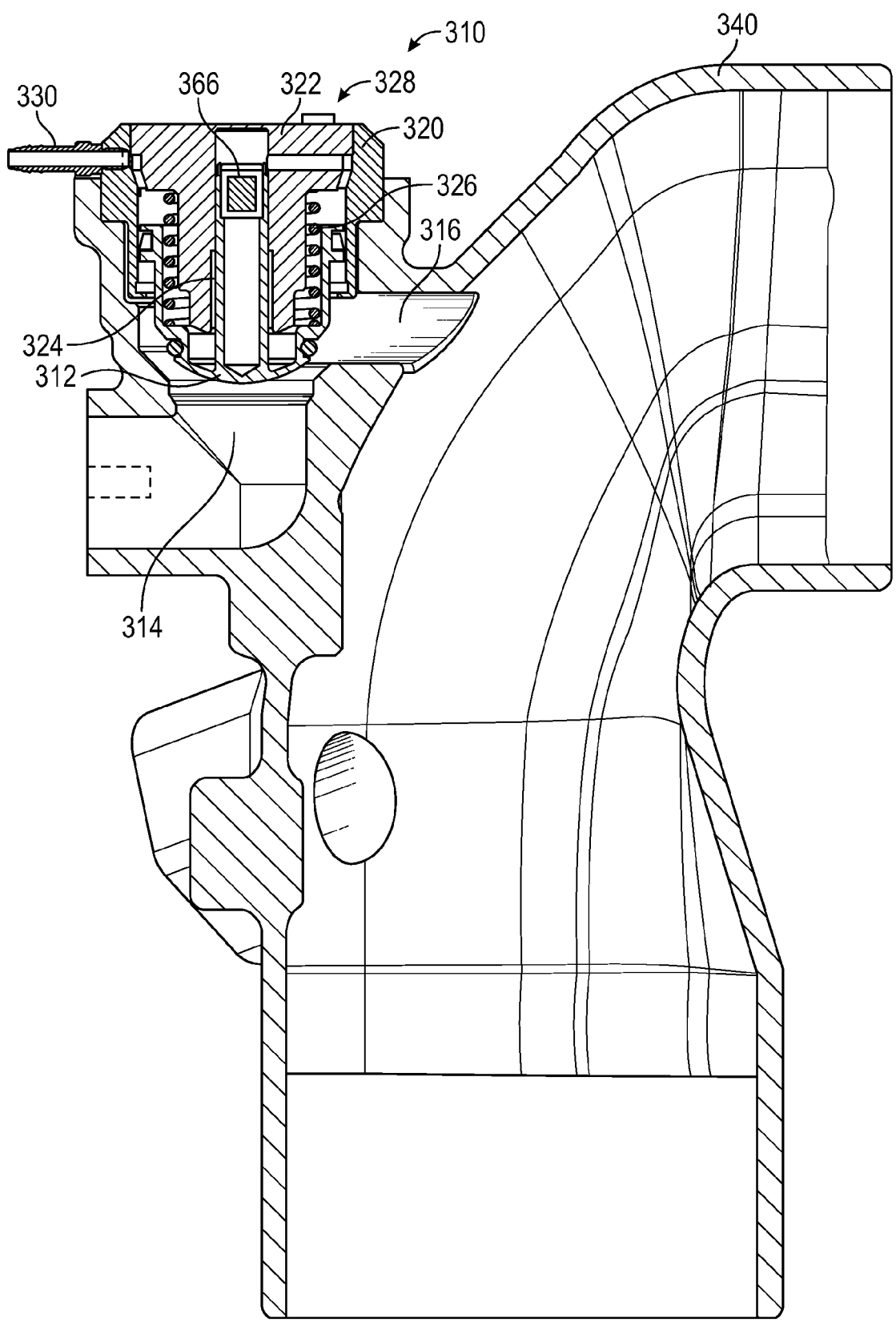
FIG. 8 is an illustration of the variable relief valve shown in FIG. 6 in a partially opened position.
Figure 9:
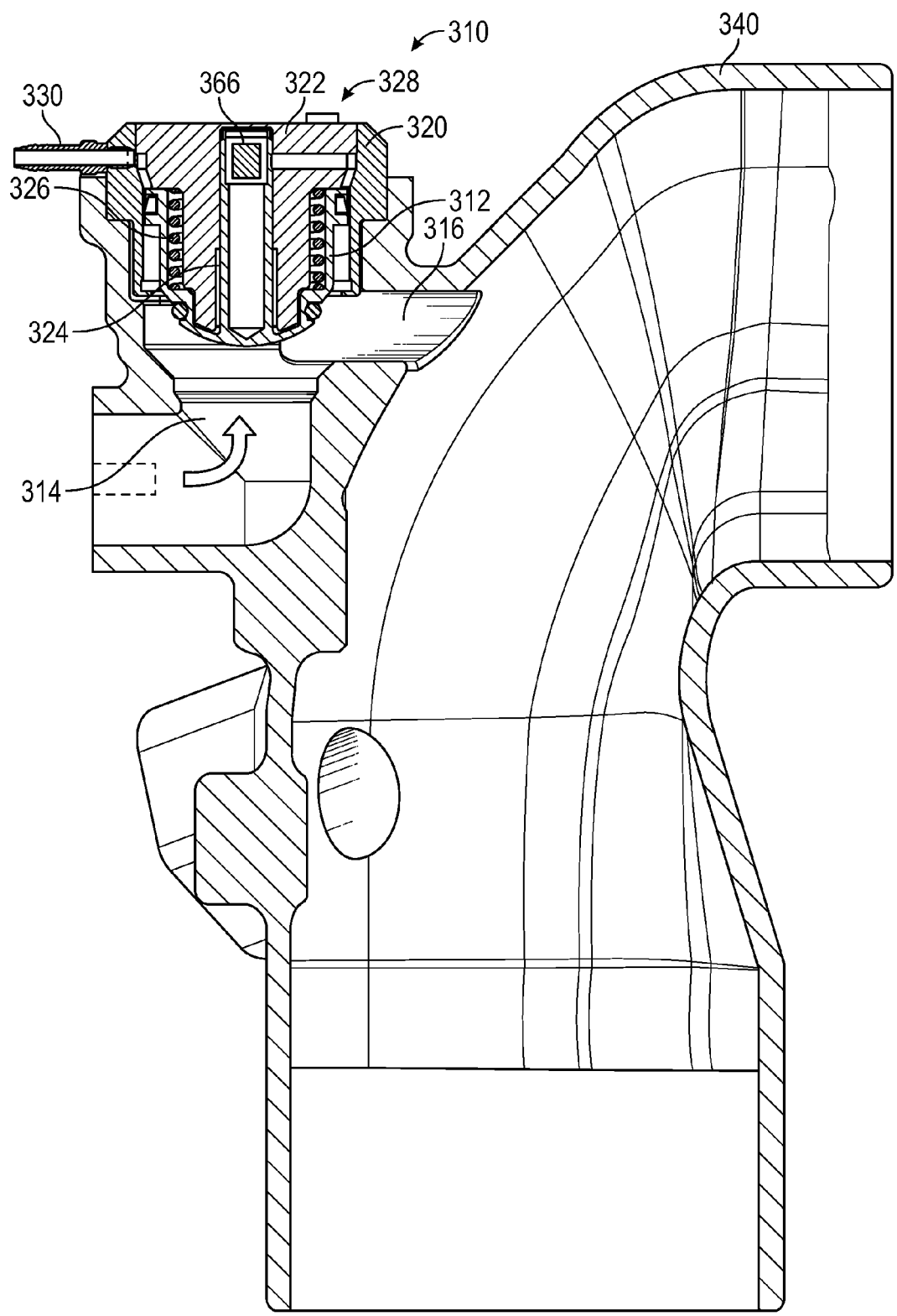
FIG. 9 is an illustration of the variable relief valve shown in FIG. 6 in an open position.

FIGS. 6-9 are an exemplary alternative illustration of a variable relief valve 310. Specifically, FIGS. 6 and 7 are an illustration of the valve 310 in the closed position, where a piston 312 blocks flow between an inlet 314 and an outlet 316 of the valve 310. FIG. 8 is an illustration of the valve 310 in a partially opened position, and FIG. 9 is an illustration of the valve 310 in a fully opened position. In the embodiments as illustrated in FIGS. 2-5, a poppet valve may be used to block flow. In contrast, the valve 310 uses the piston 312 to block the flow of fluid between the inlet 314 and the outlet 316. Referring to FIG. 6, the valve 310 may include the piston 312, an inner housing 320, an outer housing 322, a bushing 324, a biasing element 326, a position sensor 328, and a control port 330. The control port 330 may be fluidly connected to the suction port 164 of the evacuator 88 (shown in FIG. 4). The valve 310 may be seated within a chamber 332 housing 340.

The inner housing 320 and the outer housing 322 may cooperate with one another to form a void or space therebetween. The void between the inner housing 320 and the outer housing 322 may define a pressurized chamber 342. In the embodiment as shown, a body 344 of the piston 312 may also define a void or chamber 346 that is fluidly connected to the void located between the inner housing 320 and the outer housing 322. Moreover, the inner housing 320 may define a passageway 346 and an inner chamber 350. The passageway 346 may be used to fluidly connect the inner chamber 350 of the inner housing 320 with the pressurized chamber 342 of the valve 310. In the embodiment as illustrated, the inner chamber 350 of the inner housing 320 may be generally cylindrical, and is configured to receive a corresponding protrusion 352 of the piston 312. The protrusion 352 of the piston 312 may also be generally cylindrical. The bushing 324 may be placed between an inner surface 360 of the inner chamber 350 of the inner housing 320 and an outer surface 362 of the protrusion 352 of the piston 312. The protrusion 352 of the piston 312 may be hollow to define a generally cylindrical void or cavity 364 therein.

In the embodiment as shown, the void 364 of the piston 312 may receive a magnet 366 of the position sensor 328. A chip/Hall effect position sensor 368 may be placed along an upper surface 369 of the inner housing 322. The position sensor 368 may be used to sense the displacement of the magnet 366 as the piston 320 translates upwardly and downwardly within the housing 340 with respect to the upper surface 369 of the inner housing 322.

The control port 330 may be in fluid communication with the pressured chamber 342 such that vacuum from the evacuator 88 (FIG. 4) may be supplied to the pressurized chamber 342 via the control port 330. Specifically, as vacuum is applied to the pressured chamber 342 of the valve 310, the piston 312 may translate in an upwards direction within the housing 340, and into the partially opened position (shown in FIG. 8) or into the fully opened position (shown in FIG. 9).

In the non-limiting embodiment as shown, the biasing member 326 is a coil spring. The biasing element 326 may include a first end 370 and a second end 372. The first end 370 of the biasing element 372 may be seated against a shoulder 374 defined by the inner housing 320. Likewise, the second end 372 of the biasing element 326 may be seated against a shoulder 376 defined by the piston 312. The biasing element 326 may exert a biasing force against a first end 378 of the piston 312. Specifically, the biasing force may be exerted in a downwards direction, and towards the inlet port 314 of the relief valve 310. Similar to the embodiment as discussed above and illustrated in FIGS. 2-5, the biasing force may be used to prevent the piston 312 from translating within the housing 340 and into the open position due to high boost pressures in the turbo system 10 (FIG. 1).

A first seal 380 may be received by an annular recess 382 located along an outer surface 384 of the piston 312. Specifically, the first seal 380 may be located at the first end 378 of the piston 312. The first seal 380 may be, for example, an O-ring. The first seal 380 may abut against an opening 384 of the inlet 314 of the valve 310. The first seal 380 may be used to provide a generally fluid-tight seal between the piston 312 and the housing 340 when the valve 310 is in the closed position. A second seal 390 may be received by an annular recess 392 located along the outer surface 384 of the piston 312. The second seal 390 may also be an O-ring, and is located at a second end 394 of the piston 312. The second seal 390 is configured to provide sealing between the piston 312 and an inner surface 396 of the outer housing 320 as the piston 312 translates within the housing 340.

Referring generally to the figures, the disclosed evacuator may be used to provide vacuum to a relief valve. Some other types of systems that are currently available may use a vacuum pump to supply the vacuum needed to actuate a relief valve. The vacuum pump may be driven by an electric motor or by the crankshaft of an internal combustion engine. The evacuator provides a simpler, low-cost alternative for supplying vacuum to a relief valve.

The embodiments of this invention shown in the drawings and described above are exemplary of numerous embodiments that may be made within the scope of the appended claims. It is contemplated that numerous other configurations of the disclosure may be created taking advantage of the disclosed approach. In short, it is the applicants' intention that the scope of the patent issuing herefrom will be limited only by the scope of the appended claims.

What is claimed is:

1. A valve assembly, comprising:
an evacuator having a suction port that selectively applies a vacuum;
a variable relief valve having at least an open position and a closed position, the variable relief valve comprising:
an inlet and an outlet;
a piston moveable within a pressurized chamber, the piston including a first end and a second end;
a pressurized chamber fluidly connected to the suction port of the evacuator, the pressurized chamber defined in part by the first end of the piston, and wherein the piston translates within the pressurized chamber towards the open position if vacuum is applied to the pressurized chamber; and
a vent valve fluidly connected to the pressurized chamber, wherein the vent valve varies an amount of vacuum in the pressurized chamber to control a position of the piston within the pressurized chamber.

2. The valve assembly of claim 1, comprising a valve element connected to the second end of the piston, wherein the valve element includes a head that selectively blocks fluid from flowing from the inlet to the outlet.

3. The valve assembly of claim 1, wherein the variable relief valve is a poppet-style valve including a valve stem having a first end and a second end, and wherein the first end of the valve stem is connected to the send end of the piston and the second end of the valve stem may include a head.

4. The valve assembly of claim 3, wherein the head of the valve stem generally seals the outlet of the variable relief valve if the variable relief valve is in the closed position.

5. The valve assembly of claim 1, comprising a biasing element having a first end and a second end, wherein the first end of the biasing element abuts against a cap of the variable relief valve and the second end of the biasing element exerts a biasing force against the first end of the piston.

6. The valve assembly of claim 5, wherein the biasing force is exerted towards the outlet of the variable relief valve.

7. The valve assembly of claim 1, wherein the evacuator defines a converging motive section, a diverging discharge section, the suction port, and a Venturi gap, wherein the Venturi gap is fluidly connected to the suction port.

8. The valve assembly of claim 1, comprising a position sensor for detecting a position of the piston within the pressurized chamber.

9. The valve assembly of claim 1, wherein the piston blocks flow of fluid between the inlet and the outlet of the variable relief valve.

10. The valve assembly of claim 9, comprising a control port that fluidly connects the suction port of the evacuator with the pressurized chamber.

11. The valve assembly of claim 9, wherein the variable relief valve includes an inner housing and an outer housing that corporate with one another to create a space therebetween that defines the pressurized chamber.

12. The valve assembly of claim 11, wherein the piston includes a body that defines a piston chamber, and wherein the piston chamber is fluidly connected to the space between the inner housing and the outer housing.

13. A system including an exhaust-driven turbo charger, comprising:
a storage tank containing compressed air;
a control valve selectively opened to allow for the compressed air within the storage tank to flow therethrough;
an evacuator fluidly connected to the control valve and a compressor inlet of the exhaust-driven turbo charger, wherein the evacuator includes a suction port that applies a vacuum if the control valve is opened;
a variable relief valve having at least an open position and a closed position, the variable relief valve fluidly connected to the evacuator, wherein the variable relief valve is actuated into the open position if the vacuum is applies by the evacuator, the variable relief valve comprising:
an inlet and an outlet;
a piston moveable within a pressurized chamber, the piston including a first end and a second end;
a pressurized chamber fluidly connected to the suction port of the evacuator, the pressurized chamber defined in part by the first end of the piston, and wherein the piston translates within the pressurized chamber towards the open position if vacuum is applied to the pressurized chamber; and a vent valve fluidly connected to the pressurized chamber of the variable relief valve, wherein the vent valve varies an amount of vacuum in the pressurized chamber to control a position of the piston within the pressurized chamber.

14. The system of claim 13, wherein the variable relief valve is a compressor recirculation valve that is fluidly connected to and vents the compressed air back into the compressor inlet of the exhaust-driven turbo charger.

15. The system of claim 13, wherein the variable relief valve is a blow-off valve that vents the compressed air into atmosphere.

16. The system of claim 13, wherein the control valve is a solenoid valve.

17. The system of claim 13, wherein the control valve is in a normally closed position to prevent the compressed air from the storage tank from flowing through the evacuator.

* * * * *